(12) United States Patent
Doll et al.

(10) Patent No.: US 6,620,227 B1
(45) Date of Patent: Sep. 16, 2003

(54) UV CURABLE CF INK

(75) Inventors: Gary W. Doll, Englewood, OH (US); Rajendra Mehta, Centerville, OH (US)

(73) Assignee: The Standard Register Company, Dayton, OH (US)

( * ) Notice: Subject to any disclaimer, the term of this patent is extended or adjusted under 35 U.S.C. 154(b) by 130 days.

(21) Appl. No.: 09/734,351

(22) Filed: Dec. 11, 2000

(51) Int. Cl.7 .................................................. B41M 5/30
(52) U.S. Cl. ..................................... 106/31.16; 503/213
(58) Field of Search ................................. 503/209, 214, 503/216, 225, 213; 106/31.01, 31.14, 31.16

(56) References Cited

U.S. PATENT DOCUMENTS

| 3,934,500 A | 1/1976 | Jackson |
| 3,983,039 A | 9/1976 | Eastland |
| 4,091,122 A | * 5/1978 | Davis et al. ................. 427/44 |
| 4,978,969 A | 12/1990 | Chieng |
| 5,084,492 A | 1/1992 | Pinell et al. |
| 5,093,038 A | 3/1992 | Durand |
| 5,169,826 A | 12/1992 | Seitz et al. |
| 5,281,569 A | 1/1994 | Amon et al. |
| 5,623,001 A | 4/1997 | Figov |
| 5,639,708 A | 6/1997 | Golemo et al. |
| 5,655,312 A | 8/1997 | Sevcik |
| 5,770,325 A | 6/1998 | Keller et al. |
| 5,783,108 A | 7/1998 | MacKay |
| 5,840,788 A | 11/1998 | Lutz et al. |

FOREIGN PATENT DOCUMENTS

| JP | 64-1526 | 1/1989 |
| JP | 9-122271 | 5/1997 |

* cited by examiner

*Primary Examiner*—B. Hamilton Hess
(74) *Attorney, Agent, or Firm*—Killworth, Gottman, Hagan & Schaeff, L.L.P.

(57) ABSTRACT

A UV curable CF ink composition is provided which is formed from a UV curable ink base, an acidic color developer, and a solvent. The UV curable CF ink composition may be applied to a substrate inline on a printing press using conventional letterpress or offset techniques without discoloration or smudging of the ink.

8 Claims, No Drawings

UV CURABLE CF INK

BACKGROUND OF THE INVENTION

This invention relates to a UV curable CF ink, and more particularly, to a UV curable CF ink which may be applied to a substrate inline on a printing press without discoloration or smudging of the ink.

CF (coated front) inks are well known in the art for use in the production of carbonless copy papers. Such inks are typically oil-based and comprise an acidic color developer material which is normally coated on the front side of a carbonless paper set. A CB (coated back) coating containing an initially colorless dye precursor is typically coated on the back side of the carbonless paper such that when adjacent papers are mated together and pressure is applied, the CF and CB coatings react to develop a colored image on the paper. For example, Seitz et al., U.S. Pat. No. 5,169,826, teach a carbonless copy sheet utilizing a CF printing ink including a non-volatile hydrocarbon oil and an acidic color developer such as a phenolic resin. Pinell et al., U.S. Pat. No. 5,084,492, teach a CF printing ink comprising a non-volatile diluent and an acidic color developer such as a phenolic resin. However, carbonless papers currently in use cannot be easily produced inline on a printing press because of discoloration or smudging of the CF coating caused by contact with the CB coating.

It is known that UV curable inks, due to crosslinking of the ink components, are not subject to the problems of smearing or smudging. However, it has heretofore been impractical to use UV curable inks in CF applications because the phenolic resins typically used in CF inks are subject to discoloration when exposed to UV light sources.

Accordingly, there remains a need for a CF ink which may be easily applied to a substrate inline on a printing press and which avoids the problems of discoloration or smudging during processing.

SUMMARY OF THE INVENTION

The present invention meets that need by providing a UV curable CF ink including a UV curable ink base and an acidic color developer which does not discolor when subjected to UV light. The ink may be easily applied to a substrate inline on a printing press using conventional letterpress or offset techniques.

In accordance with one aspect of the present invention, a UV curable CF ink is provided comprising a UV curable ink base, an acidic color developer, and a solvent for the acidic color developer. The acidic color developer preferably comprises bis-(3-allyl-4-hydroxy phenyl)sulfone (TGSA) or 4,4-disulfonyl phenol (SFDP). The solvent for the acidic color developer is preferably selected from the group consisting of methyl pyrrolidone, vinyl ethers, and polar acrylate monomers.

The UV curable CF ink also preferably includes a photoinitiator. The ink is preferably curable by UV radiation at a wavelength of from about 200–410 nanometers.

In a preferred embodiment of the invention, the UV curable CF ink comprises about 15 to 30% by weight of a UV curable ink base, from about 20 to 60% by weight of an acidic color developer, and about 10 to 30% by weight of a solvent. The ink also preferably, but optionally, includes from about 1 to 2% by weight of the photoinitiator.

The present invention also provides a method for applying the UV curable CF ink to a substrate having first and second surfaces in which the ink is applied to at least a portion of the first or second surface. The ink is then cured. The resulting CF coated sheet is solvent and heat resistant and may then have indicia printed thereon in laser printers without discoloration or premature coloration of the ink.

Accordingly, it is a feature of the present invention to provide a UV curable CF ink composition which may be easily applied to a substrate inline without the problems of discoloration or smudging. These and other features and advantages of the present invention will become apparent to those skilled in the art from a reading of the following detailed description of the preferred embodiments, and the appended claims.

DETAILED DESCRIPTION OF THE PREFERRED EMBODIMENTS

The UV curable CF ink composition and method of the present invention provides several advantages over prior oil-based CF inks. First, the ink of the present invention utilizes color developers which do not discolor upon exposure to UV light. Further, because the ink is UV curable, discoloration or smudging of the CF ink by the CB coating is reduced or eliminated. Finally, the UV curable CF ink can be easily produced inline on a printing press using conventional printing techniqiues.

The UV curable ink base included in the CF ink is a clear thick varnish also commonly referred to as "mixing white" or "transparent white". A preferred ink base is KC 98-1410 UV, which is commercially available from Kohl & Madden Ink, a division of Sun Chemical Corp. Other suitable base inks include "transparent white" or "transparent ink", available from Flint Ink and other commercial suppliers of UV curable inks. The UV curable ink base preferably comprises about 15 to 30% by weight of the ink and preferably has a solids content of from about 25 to 27% by weight. The ink base is preferably substantially free of oils.

Suitable acidic color developers for use in the ink composition include bis-(3-allyl-4-hydroxy phenyl)sulfone, commercially available from Nagase America under the designation TGSA and 4,4-disulfonyl phenol; commercially available from ALFA Chemical, Kingspoint, N.Y. under the designation SFDP. Other suitable color developers include zinc salicylate and phenolic resins, commercially available from Schenectady Chemicals, Inc., Schenectady, N.Y. The color developers should be compatible with the UV curable ink base and should not discolor upon exposure to UV light. The acidic color developer is preferably present in the CF ink composition in an amount of from about 20 to 60% by weight.

A preferred solvent for use in the present invention is methyl pyrrolidone. The solvent functions to dissolve the color developer and keep it in solution so that it remains dispersed in the UV coating after curing while remaining reactive to the color former in the CB coating. Other suitable solvents include vinyl ethers and polar acrylate monomers. The solvent preferably comprises about 10 to 30% by weight of the CF ink composition.

The CF ink composition also preferably includes a photoinitiator to initiate UV curing of the base ink. The photoinitiator is preferably activated when exposed to UV radiation in the range of from about 200 to 410 nanometers. A preferred photoinitiator is commercially available from CIBA Specialty Chemicals Corp., Tarrytown, N.Y. under the designation Darocur 4265 (trademark). Other suitable photoinitiators include benzophenol type photoinitiators such as benzophenone and Irgacure 651 (trademark), acetophenone type photoinitiators, and any free radical light initiated photocatalysts. The photoinitiator is preferably included in an amount of about 1 to 2% by weight.

In the preferred method of making the UV curable CF ink composition of the present invention, the acidic color developer is mixed with the UV curable ink base and heated to about 300° F. while adding the solvent until the acidic color developer dissolves into the mixture. The mixture is then cooled to about 150° F. before adding the photoinitiator. The ink composition is then preferably cooled until it reaches room temperature, at which point the ink composition is ready to be used.

The UV curable CF ink may be readily applied to a support substrate such as a paper sheet or web using conventional letterpress or offset equipment. A preferred method for applying the ink is letterpress. The ink is preferably applied to a substrate traveling at 250 feet per minute using a 400 watt UV lamp source. A suitable UV lamp source for use in the present invention is commercially available from Fusion Systems, Frederick Md. It should be appreciated that the press speed may be increased with a higher wattage UV curing unit or the use of additional lamp stations.

The UV curable CF ink of the present invention may be used to produce a carbonless copy paper CF sheet or web having a coating on the entire surface or a spot coating of the CF ink applied in any desired pattern. It may also be used to produce a CFB sheet where the CF material is coated on the first side of the support sheet and a CB material is coated on the second side of the support sheet. The resulting CF coated sheet is solvent and heat resistant and may be printed using non-contact printers such as laser printers.

In order that the invention may be more readily understood, reference is made to the following example, which is intended to be illustrative of the invention, but is not intended to be limiting in scope.

EXAMPLE

The following materials were combined to form a UV curable CF ink:

| Ingredient | Weight % |
| --- | --- |
| UV curable ink base[1] | 25.17 |
| acidic color developer[2] | 50.34 |
| solvent[3] | 23.49 |
| photoinitiator[4] | 1.00 |

[1]KC 98-1410 UV from Kohl & Madden Ink
[2]TGSA from Nagase America
[3]Methyl Pyrrolidone
[4]Darocur 4265 from CIBA Specialty Chemicals Corp.

A second UV curable CF ink was prepared comprising the following materials:

| Ingredient | Weight % |
| --- | --- |
| UV curable ink base[1] | 26.98 |
| acidic color developer[2] | 53.97 |
| solvent[3] | 17.98 |
| photoinitiator[4] | 1.07 |

[1]KC 98-1410 UV from Kohl & Madden Ink
[2]TGSA from Nagase America
[3]Methyl Pyrrolidone
[4]Darocur 4265 from CIBA Specialty Chemicals Corp.

These UV curable CF inks were printed on individual substrates (24# register bond) using letterpress equipment and then cured using a UV lamp. No discoloration was observed. The printed substrates were subsequently run through an HP LaserJet 5P laser printer. No premature coloration was observed.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A UV curable CF ink comprising a UV curable ink base, an acidic color developer, and a solvent for said acidic color developer; wherein said solvent maintains said acidic color developer in solution so that it remains dispersed in said ink after curing.

2. The UV curable CF ink as claimed in claim 1 wherein said solvent is methyl pyrrolidone.

3. The UV curable CF ink as claimed in claim 1 including a photoinitiator.

4. The UV curable CF ink as claimed in claim 1 in which the ink base is curable by UV radiation at a wavelength of from about 200–410 nanometers.

5. A UV curable CF ink comprising:

about 15 to 30% by weight of a UV curable ink base;

about 20 to 64% by weight of an acidic color developer; and about 10 to 30% by weight of a solvent which maintains said acidic color developer in solution so that it remains dispersed in said ink after curing.

6. The UV curable CF ink as claimed in claim 5 further including about 1 to 2% by weight of a photoinitiator.

7. A UV curable CF ink comprising a UV curable ink base, an acidic color developer comprising bis(3-allyl-4-hydroxy phenol)sulfone or 4,4-disulfonyl phenol, and a solvent for said acidic color developer.

8. A UV curable CF ink comprising a UV curable ink base, an acidic color developer, and a solvent for said acidic color developer, said solvent comprising methyl pyrrolidone.

\* \* \* \* \*